Feb. 16, 1960
M. BAERMANN
2,925,558
ELECTRICAL LONG SCALE MEASURING INSTRUMENT
OF THE MOVING COIL TYPE
Filed Feb. 3, 1956
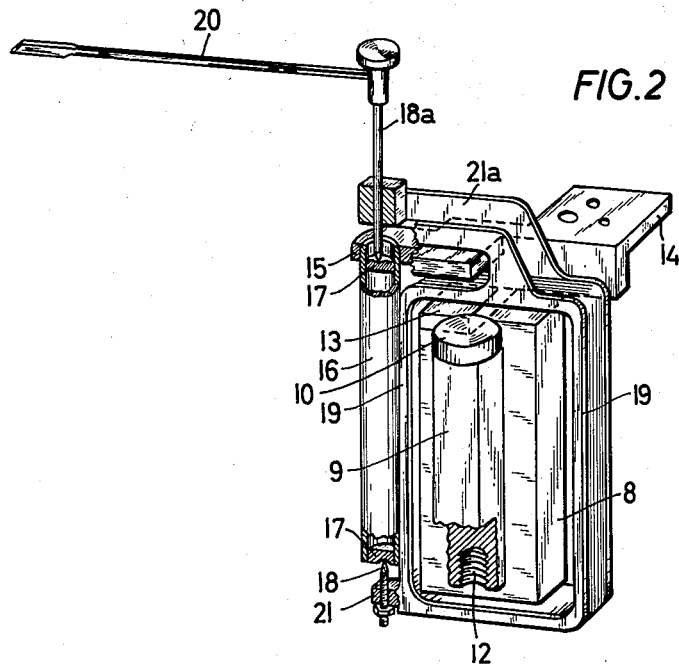
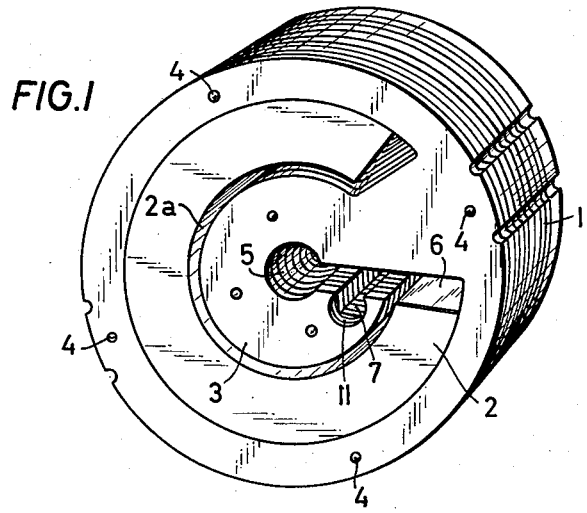
INVENTOR.
MAX BAERMANN
BY & nbsp;

2,925,558

ELECTRICAL LONG SCALE MEASURING INSTRUMENT OF THE MOVING COIL TYPE

Max Baermann, Koln, Germany

Application February 3, 1956, Serial No. 563,390

Claims priority, application Germany February 15, 1955

6 Claims. (Cl. 324—150)

This invention pertains to the art of electrical measuring instruments and more particularly to a long scale measuring instrument of the moving coil type, using a ring-shaped radially magnetized field magnet.

In the art of long scale measuring instruments, it is known to employ a radially magnetized field magnet disposed inside of a closed ring of magnetically permeable material. In such instruments, the inner or opposite pole positioned within the ring magnet is also ring-shaped and is supported from the outer magnetically permeable ring by a crosspiece of like material. The assembly of such an instrument has been found to be extremely difficult, inasmuch as the various parts must be assembled with the magnetic system one by one and then adjusted.

It is also known to provide measuring instruments having axially magnetized field magnets with a hooked inner pole whereby the measuring coil can be slipped through the opening of the hooked pole and assembled therewith. Here also the assembly of the various parts is relatively complicated since most of the parts must be built into the heavy and bulky magnetic system one by one.

The present invention contemplates a long scale measuring instrument which overcomes all of the above-referred to difficulties and others, and provides a measuring instrument wherein all of the many delicate parts may be assembled and tested independently of the magnetic system and then simply and quickly mounted as a unit with the already completed magnetic system.

In accordance with the present invention, a long scale electrical instrument is provided comprising, in combination: a ring-shaped radially magnetized field magnet, a hooked pole disposed within the opening of the field magnet and a supporting member supported within the opening of the hooked pole and carrying the moving parts of the instrument, including the moving coil and all of the parts required for its support and conduction of current to it, such supporting member and parts being so arranged that they may be assembled while removed from the magnetic system and after testing then assembled with the magnetic system.

Further in accordance with the invention, there is provided in an electrical long scale measuring instrument, a split, ring-shaped, radially magnetized field magnet and a pre-formed magnetic yoke comprised of an outer closed ring of magnetic material and an integral hook-shaped pole extending through the split into the inside of the ring magnet to limit the air gap thereof. With such an arrangement, it is possible to push the ring magnet axially out of a magnetizing device into the yoke without opening the magnetic circuit thereof and the resultant lowering of the magnetic strength of the magnet.

A further advantage of such an arrangement is that the outer closed ring and the hooked pole can be pre-formed from a stack of laminations which can be cheaply and accurately made by a stamping process. If the ring-shaped magnet is also made to accurate measurements, a completely symmetrical air gap may be obtained and a uniform magnetic field throughout the entire space between the ring magnet and the outer surface of the hooked pole.

Further in accordance with the invention, the supporting member which is inserted into the opening of the hooked pole carries a stirrup partially surrounding the moving coils in one position of the coil to which a tube-shaped body may be fastened for holding the stationary supporting parts for the coil whereby the scale length may be a maximum.

Further in accordance with the invention, the supporting member and the slit of the hooked pole are provided with a complementary groove and lug so as to accurately locate the axis of the moving parts relative to the axis of the coil space between the magnet and the hooked pole.

The principal object of the invention is the provision of a new and improved electrical measuring instrument of the long scale type employing a radially magnetized field magnet which is simple in construction, simple to manufacture and accurate in operation.

Another object of the invention is the provision of a new and improved measuring instrument of the type described wherein the moving parts including the moving coil and the members for conducting current to it are all mounted on a single supporting member which, in turn, is mounted in the magnetic system and accurately locates such moving parts relative to the magnetic system.

Still another object of the invention is the provision of a new and improved magnetic system for long scale electrical measuring instruments employing a radially magnetized magnet wherein the magnet may be moved from its magnetizing field to a yoke without opening its magnetic circuit.

Still another object of the invention is the provision of a new and improved arrangement for mounting moving parts of a long scale electrical measuring instrument relative to its magnetic field which accurately locates the moving parts relative to the magnetic system upon assembly and maintains such moving parts in such accurately located position.

Still another object of the invention is the provision of a new and improved long scale electrical measuring instrument which is subject to mass production, manufacturing and assembly methods.

The invention may take physical form in certain parts and arrangement of parts, a preferred embodiment of which will be described in detail in this specification and illustrated in the accompanying drawings which are a part hereof and wherein:

Figure 1 shows a perspective view of a magnetic system for a long scale electrical measuring instrument constructed in accordance with the present invention; and, Figure 2 shows a perspective view of the moving parts and the supporting members of such instrument.

Referring now to the drawings, wherein the showings are for the purposes of illustrating the invention only and not for the purposes of limiting same, the magnetic system of Figure 1 is comprised generally of a hollow cylindrical body 1 of magnetically permeable material and a permanent magnet 2 in the shape of a split ring which is inserted in the body 1 and lies tightly against the inner wall thereof. The cylindrical body 1 has a pole 3 extending inwardly from its inner surface through the split of the magnet 2 and has an outer surface spaced from the inner surface of the magnet 2 to provide a working air gap 2a.

The cylindrical body 1 and the pole 3 are integrally formed of magnetically permeable material and is preferably made of a stack of laminations stamped to a desired and uniform shape and riveted together by means of pins 4 extending longitudinally through the stack.

The pole 3 has a bore 5 coaxial with the working air gap 2 and a slit 6 extending radially outwardly from the bore 5 so that the pole 3 is in the form of a hook as shown. A groove 7 preferably having a rectangular cross-section extends parallel to the axis of the bore 5 from the side of the slit of the hooked pole 3. This groove 7 terminates at one end in a circular recess 11 of greater diameter for purposes which will appear hereinafter.

The magnet 2 is of the radially magnetized type, the magnetic circuit thereof being completed across the air gap 2a through the pole 3 and outer cylindrical body 1.

With the arrangement shown, it will be appreciated that the magnet 2, as it is manufactured, may at the completion of its manufacture, be subjected to a high-strength magnetizing field and that without removing this magnetizing field, the magnet 2 may be pushed axially into the cylindrical body 1 so that at no time does the magnet 2 even have a larger air gap than that of the air gap 2a. It will thus not be subjected to the demagnetizing effects of a large air gap and particularly an air gap larger than its ultimate working air gap.

Referring now to Figure 2, the parts of the measuring instrument shown therein include a supporting member 8 having a thickness to snugly fit into the slit 6 of the hooked pole 3 into which it will be eventually inserted when the instrument is finally assembled. The member 8 has on its side a lug 9 of a cross-sectional shape the same as that of the groove 7 which lug 9 terminates at its upper end in a member 10 of circular cross-section which will fit into the recess 11. The opposite end of the lug 9 has a threaded bore 12 by means of which the member 8 can be fastened tightly in the slit 6 by means of a counter-sunk screw (not shown). The member 8 can be made of magnetically permeable material so that when assembled in the slit of the hooked pole 3, a generally uniform magnetic path will be provided from the body 1 to all portions of the pole 3.

This arrangement provides complementary means in the slit 6 and on the member 8 for locating the moving parts of the instrument both axially and radially relative to the magnetic system.

A bracket having a pair of spaced parallel extending legs 13, 15 is provided with the lower leg 13 fastened in a recess on the upper left-hand corner of the supporting member 8. The upper lug 15 has an opening therein in which a tubular member 16 is rigidly mounted. This member 16 extends parallel to the lug 9 and has a diameter such as to fit into the bore 5 of the hooked pole 3. The bracket also has a lug 14 extending in the opposite direction from the lugs 13, 15 on which insulated parts for fastening the wires, springs and other parts (not shown) may be mounted for conducting the electrical currents and providing a return bias for the moving parts.

The tubular member 16 has mounted at opposite ends thereof a pair of jeweled supports 17 having oppositely facing recesses in which pointed ends of shafts 18, 18a are pivotally supported. A coil frame, generally in the shape of a rectangle, has at its lower end a lug 21 in which the shaft 18 is mounted and at its upper end a supporting arm 21a which extends upwardly from the frame 19 over the lug 15 and is fixed to the shaft 18a. With this arrangement, the coil frame 19 may be freely pivoted through a maximum angle around the support member 8, the only limitation on the angle of movement being the circumferential thickness of the bracket from which the lugs 13, 14 and 15 are formed.

An indicating needle 20 is provided mounted on the shaft 18a disposed at an angle of 180° with reference to the coil frame 19. Any other angle may be employed.

It will be seen that all of the members shown in Figure 2 may be assembled completely independently of the magnetic system of Figure 1. Additionally, the other parts of the instrument; such as, without limitation, the return hair spring, the current supply parts, the balance weight and the like, may be assembled at the same time. These parts are not shown in the drawing as they form no part of the present invention and would merely serve to obscure the essential features of the preferred embodiment constructed in accordance with the invention.

After the assembly of all of the parts shown in Figure 2 and the others referred to, the coil frame 19 is moved to the position shown in Figure 2 and the instrument is then assembled with the magnetic system of Figure 1 by sliding the parts into the bore 5, the slit 6 of the hooked pole 3 and the groove 7. The lower surface of the circular member 10 comes to rest on the base of the circular recess 11. A screw (not shown) having a head of a greater dimension than the cross-sectional dimensions of the lug 9 is then inserted in the threaded bore 12 to hold the parts in assembled relationship of the magnetic system.

It will be noted that the lug 9 accurately locates the tubular member 16 and thus the axes of the shafts 18, 18a relative to the outer surfaces of the hooked pole 3. The coil frame 19 may thus pivot about the jeweled supports 17 through the air gap 2a, the angle of pivoting being limited by the circumferential thickness of the portion of the cylindrical body 1 joining it with the hooked pole 3.

With the construction shown, it will be appreciated that the laminations can be stamped from one, or at most two, dies so that the stack will have absolutely uniform dimensions, when assembled with an accurately formed magnet, the air gap 2a can be uniform not only over its entire dimensions but from instrument to instrument. Thus, the problems of testing and adjusting are considerably alleviated.

It will also be appreciated that the arrangement for pivotally supporting the coil frame 19 relative to the support member 8 is a preferred embodiment and that considerable variations in the method of mounting this coil frame can be made without departing from the scope or sphere of the invention; for example, the lower end of the support member 8 could have an arrangement similar to the upper end for providing the bearing support for the lower shaft 18 in which case the intermediate supporting tube 16 can then be eliminated.

It will also be appreciated that other means can be provided for locating the support member 8 in both an axial and a radial direction relative to the surfaces of the hooked pole 3 without departing from the spirit or scope of the invention. The arrangement shown is simple and is preferred.

Thus, it will be seen that a long scale measuring instrument having a radially magnetized magnet has been described which overcomes all the difficulties of the prior art heretofore referred to, accomplishes all of the objectives of the invention and others, is simple in construction, readily assembled, may have a magnetic field of maximum strength and is accurate and dependable.

Having thus described my invention, I claim:

1. An electric long scale measuring instrument of the moving coil type comprising, in combination: a C-shaped radially magnetized magnet having a split, and an encircling yoke of magnetically permeable material having an integral pole extending through said split into the opening of said magnet in spaced relationship with the inner surfaces thereof to form an air gap, said pole having a central opening and a slit from the opening to the outer surfaces thereof, a bearing support in said central opening and spaced from the surfaces thereof, a support member in said slit and supporting said bearing support and a moving coil pivotally supported on said bearing support in said air gap and the space between the bearing support and the surfaces of the central opening.

2. The combination of claim 1 wherein said slit and support member each have a complementary axially extending groove and lug for accurately locating the support member and thus the pivot axis relative to the surfaces of the air gap.

3. The combination of claim 2 wherein the lug and groove have at one end complementary enlargements whereby to position the support member in an axial relationship to the magnet.

4. The combination of claim 1 wherein said support member in said slit has means engageable with the surfaces of said slit to accurately locate same in a radial direction.

5. The combination in claim 1 wherein said support member in said slit has means for accurately locating itself in an axial direction relative to said pole.

6. The combination of claim 1 wherein said support member in said slit has means for accurately locating itself relative to said pole in both an axial and a radial direction.

References Cited in the file of this patent

UNITED STATES PATENTS

| | | |
|---|---|---|
| 2,272,766 | Corson | Feb. 10, 1942 |
| 2,320,632 | McMaster | June 1, 1943 |
| 2,394,113 | Seaver | Feb. 5, 1946 |
| 2,394,724 | Snorek | Feb. 12, 1946 |
| 2,419,100 | Weaver | Apr. 15, 1947 |
| 2,465,053 | Baranowski | Mar. 22, 1949 |
| 2,515,014 | Lamb | July 11, 1950 |

FOREIGN PATENTS

| | | |
|---|---|---|
| 483,539 | Great Britain | Apr. 21, 1938 |